March 6, 1945. S. KAHN 2,370,965
PULSATION DAMPENER
Filed July 16, 1943
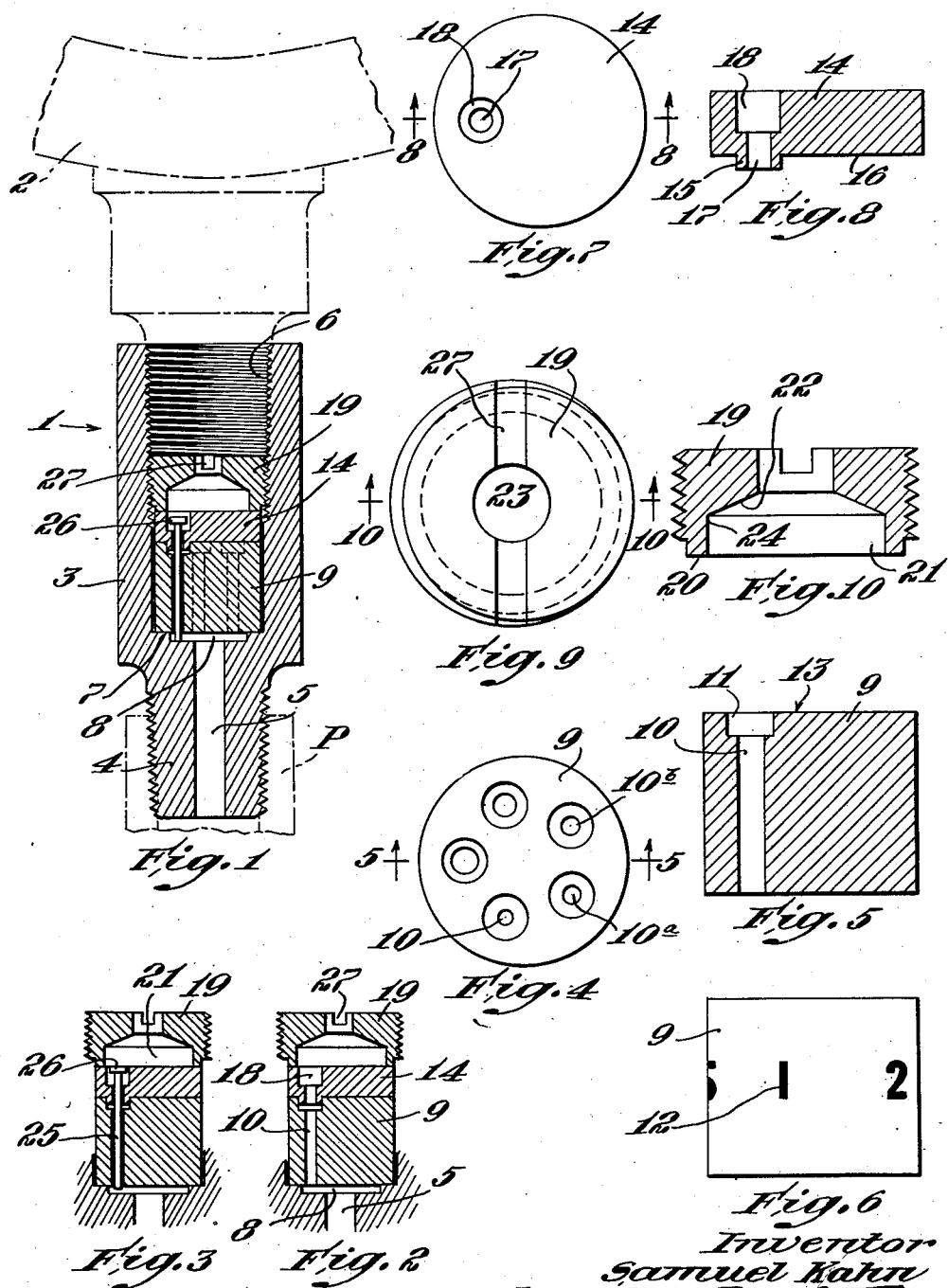
Inventor
Samuel Kahn Patented Mar. 6, 1945

2,370,965

UNITED STATES PATENT OFFICE 2,370,965

PULSATION DAMPENER

Samuel Kahn, Bridgeport, Conn., assignor to Manning, Maxwell & Moore, Incorporated, New York, N. Y., a corporation of New Jersey Application July 16, 1943, Serial No. 495,061

9 Claims. (Cl. 138—46)

This invention pertains to apparatus useful for indicating the pressure of a fluid, and relates more particularly to a pulsation dampener or shock absorber designed to be interposed between a source of pressure and an indicating or recording instrument.

When a pressure gauge or similar sensitive instrument is used in association with apparatus wherein fluid pressure pulsates or fluctuates rapidly within the working range, for instance when a gauge is directly connected to the delivery pipe of a reciprocating pump, it is customary to interpose between the pipe and gauge a flow restricting element, shock absorber, or pulsation dampener operative to damp out rapid variations in pressure while permitting relatively slow changes to affect the instrument in usual manner, thereby minimizing flutter of the instrument pointer and preventing damage to the delicate parts.

Fluids of widely differing viscosity and having working pressure ranges which vary very greatly are encountered in the engineering field but pulsation dampeners, as heretofore constructed, have been quite limited as respects the viscosity of fluid with which they may be used and the pressure range to which they may be accommodated.

A principal object of the present invention is to provide a pulsation dampener which is capable of effective use with fluids of different viscosities and which may be accommodated to a wide range of pressures. A further object of the invention is to provide a pulsation dampener of a broad range of utility but which is of simple, durable, reliable and relatively inexpensive construction; which occupies but little space, and which is applicable to instruments, for example pressure gauges, without necessitating any modification of the instrument itself. A further object is to provide a pulsation dampener which is self-clearing so that it is not readily clogged and made ineffective by dirt or solid particles in the pressure fluid. A further object is to provide a pulsation dampener as a single, self-contained unit comprising but few parts and which is very readily adjustable for use under widely different conditions. Other and further objects and advantages of the invention will be pointed out in the following more detailed description and by reference to the accompanying drawing wherein, Fig. 1 is a diametrical section of a pulsation dampener embodying the present invention, such dampener being shown associated with a pressure gauge, the latter being indicated in broken lines and in part only;

Fig. 2 is a fragmentary section on the same plane as Fig. 1, omitting certain of the parts;

Fig. 3 is a view similar to Fig. 2 showing the passage-constricting pin in partially raised position;

Fig. 4 is a plan view, to larger scale, of a cylindrical block or bushing forming a part of the pulsation dampening means;

Fig. 5 is a section on the line 5—5 of Fig. 4;

Fig. 6 is a side elevation of the device shown in Fig. 4;

Fig. 7 is a plan view of a cover member or sealing disk forming part of the apparatus;

Fig. 8 is a section on the line 8—8 of Fig. 7;

Fig. 9 is a plan view of a pressure-applying nut forming part of the apparatus; and Fig. 10 is a section on the line 10—10 of Fig. 9.

Referring to the drawing, the numeral 1 designates generally the pulsation dampening device of the present invention, such device being shown associated with a pressure gauge 2 or similar instrument having a supporting stem or nipple externally screw threaded in usual manner.

The pulsation dampener comprises a substantially cylindrical casing 3 of any suitable material, for example metal or a moulded plastic, having an externally screw-threaded lower end or nipple portion 4 for connection to a supply pipe P. This nipple portion 4 is provided with an axial bore 5 which opens at its upper end into a vertically elongate cylindrical chamber in the body of the casing. The upper portion of the inner wall of this chamber is screw threaded as shown at 6. The floor of this chamber has an annular marginal shoulder 7 bounding a shallow downward extension 8 of the chamber into which the passage 5 opens.

A cylindrical block or bushing 9 (Figs. 1, 4, 5 and 6) having flat upper and lower surfaces is disposed within the chamber in the body portion of the casing and rests upon the annular shoulder 7. This bushing is provided with a plurality of parallel, axially extending passages 10, 10ᵃ, 10ᵇ, etc., of progressively different diameters, these passages extending through the bushing from top to bottom and all opening at their lower ends into the space 8. At their upper ends the several passages are furnished with coaxial counterbores 11 extending down from the upper end 13 of the bushing, the several counterbores being of the same diameter.

The upper surface of the bushing 9 is substantially flat, and upon this flat surface rests a cover member or sealing disk 14 (Figs. 7 and 8). This cover member or disk is of substantial thickness, having a flat bottom surface 16 from which projects a short tubular boss 15 of such external dimensions and so located that it may seat in any one of the counterbores 11. The axes of the several passages 10, 10ª, 10ᵇ, etc., are spaced equally in a radial direction from the axis of the bushing 9 and the boss 15 of the cover 14 is so arranged that by rotation of the cover member, the boss 15 may be seated in any selected one of the counterbores 11. The boss 15 has an axial bore 17 of a diameter at least as great as the diameter of the largest of the passages 10, 10ª, etc., and at its upper end opens into a counterbore 18. To assist in selecting the desired passage in the bushing 9, the circumferential outer surface of the latter is preferably provided with index characters 12, for example numerals, disposed radially with respect to the axes of the several passages.

An annular nut 19 (Figs. 1, 9 and 10) provided with external screw threads which are engageable with the internal screw threads 6, has a lower, annular flat surface 20 which is designed to engage the cover 14 and thus clamp the cover firmly against the upper surface of the bushing 9. The radial width of the surface 20 is such that it does not substantially overlap the counterbore 18 of the cover 14. This nut 19 has a cavity 21 in its under side, bounded by the inner edge of surface 20 and is always in free communication with the counterbore 18 regardless of the position in which the cover may be placed. The upper wall of the cavity 21 slopes inwardly and upwardly as shown at 22, the cavity merging with an axial bore 23 of substantial diameter, opening into the upper part of the chamber of the casing 3. The nut 19 is preferably provided with a transverse slot 27 for the application of a suitable wrench or other tool whereby the nut may be screwed downwardly and into forcible engagement with the cover 14, thus pressing the cover leak-tight against the upper flat surface 13 of the bushing and at the same time pressing the lower surface of the bushing into leak-tight contact with the shoulder 7.

The pulsation dampener comprises a pin 25 of a diameter somewhat less than the diameter of the smallest of the passages 10, 10ª, etc. When this pin is disposed in any one of the passages it constricts such passage, although still leaving some space between it and the wall of the passage through which pressure fluid may pass. The pin is preferably of a length such that when its lower end rests upon the bottom of the chamber 8 (Fig. 1) its upper end is disposed in the counterbore 18 of the cover 14. Preferably this pin is provided with a head 26 at its upper end to facilitate its withdrawal from the passage when desired.

By the employment of passages 10, 10ª, etc., of different diameters it becomes possible, by disposing the pin 25 in the properly selected passage, to accommodate the pulsation dampener for use with fluids of different viscosities or which are subject to different rates of pressure fluctuation or to different ranges of pressure. In thus adapting the instrument for use under any particular conditions, the nut 19 is first removed, the pin 25 is withdrawn from the passage in which it was previously disposed, the cover 14 is lifted and rotated until its single aperture 17 is aligned with the selected passages 10, 10ª, etc., the boss 15 of the cover is seated in the corresponding counterbore 11, the pin is then dropped down through the counterbore 18 and aperture 17 and into the selected passage in the bushing 9, and the nut 19 is screwed down so as to compress the cover and thus seal the upper ends of all of the passages 10, 10ª, etc., in the bushing 9 except the passage in which the pin is disposed. The gauge stem is then screwed into the upper part of the chamber in the casing 3 and the instrument is ready for use.

The passages 10, 10ª, etc., in the bushing 9, in which the pin 25 is for the time being disposed, affords the only line of communication between the supply pipe and the gauge. The bore 17 in the cover is at least as large as the largest of the passages in the bushing 9 while the counterbore 18 is of substantially greater diameter. If the pin be lifted by the pulsation of the fluid, the head of the pin will ultimately engage the sloping surface 22 of the cavity 21, thus limiting its rise. The diameter of the head 26 of the pin is such that it exerts no appreciable restricting effect upon the passage of fluid through the counterbore 18. In response to pressure pulsation, the pin rises and falls, thus preventing the vary narrow annular canal between it and the wall of the passage from becoming plugged with sediment. The head 26 of the pin is not necessary to affect such motion, but is useful in lifting the pin when it is to be transferred to a different passage.

The device as thus provided is of small external dimensions and comprises but a single moving part, to wit, the pin 25. The casing of the device may be connected directly to the supply pipe in the same way that the gauge nipple is usually connected, and the gauge nipple is merely screwed into the upper part of the casing so that no special or unusual fittings are required. Furthermore as above described, it is a very simple operation to adapt this pulsation dampener for use under different conditions and in doing so no substitution of parts is necessary, the only requirement being that the pin 25 be shifted from one passage to another.

While one desirable embodiment of the invention has herein been described by way of example, it is to be understood that the invention is broadly inclusive of any and all modifications and substitutions which fall within the terms of the appended claims.

I claim:

1. A self-clearing pulsation dampener for use with pressure gauges, said pulsation dampener comprising a part having therein a plurality of passages respectively of different transverse section, a movable passage-constricting element constructed and arranged to cooperate at will with any selected one of said passages thereby to restrict the flow capacity of said selected passage, and means operative completely to close all of the several passages except that with which the constricting element for the time being cooperates.

2. A self-clearing pulsation dampener for use with pressure gauges, said pulsation dampener comprising a part having therein a plurality of parallel passages respectively of different diameters, a passage-constricting element constructed and arranged to cooperate with any selected one of said passages thereby to restrict the flow capacity of said passage, said constricting element being movable in response to pressure fluctuations thereby to clear the passage with which it cooperates, and closure means which completely blocks all of the passages except that one with which the constricting element for the time being cooperates.

3. A self-clearing pulsation dampener for use with pressure gauges, said pulsation dampener comprising, a part having therein a plurality of parallel passages respectively of different diameters, a throttling and clearing pin cooperating with any selected one of said passages thereby to restrict the flow through the selected passage, the pin being longitudinally movable in response to pressure fluctuations thereby to clear the passage in which it is disposed, and a removable closure member operative completely to close all of the passages except that within which the pin is disposed.

4. A pulsation dampener for use with pressure gauges, said pulsation dampener comprising a part having therein a plurality of parallel passages respectively of different diameters, each passage, at its upper end, having a counterbore, all of said counterbores being of the same diameter, a closure member having at its under side an annular boss designed to fit in any selected one of said counterbores, said closure member, when its boss is so seated in a selected one of said counterbores, completely closing the other counterbores, and a passage-constricting pin extending through the annular boss in the closure member and into the corresponding passage, said pin being of such diameter that it may be disposed with a loose fit in any selected one of the passages thereby to restrict fluid flow through the selected passage.

5. A pulsation dampener comprising a case provided with means for connecting it to a supply pipe and to a pressure gauge respectively, said casing having therein an elongated chamber, a block housed in the lower part of said chamber, said block having therein a plurality of parallel passages respectively of different diameters all communicating at their lower ends with the supply pipe, a cover member engaging the upper surface of the block, said cover member having a single aperture which may be arranged coaxially with any selected one of the passages, the cover being designed completely to close all but the selected passage, a movable passage-constricting and clearing pin operative to restrict any of said passages in which it may be disposed, said pin projecting through the aperture in the cover member, and means for pressing the cover leak-tight against the upper surface of the block.

6. A pulsation dampener comprising a casing having provision for connecting its lower end to a supply pipe and its upper end to a gauge stem, said casing having therein a cylindrical chamber having an annular shoulder at its lower end, the space bounded by the shoulder communicating with a passage designed to lead to a supply pipe, a cylindrical bushing seated on said shoulder within the chamber, the bushing having a plurality of axially extending passages respectively of different diameters and spaced apart circumferentially of the bushing and at equal distances from the axis of the bushing, each said passage having a counterbore at its upper end, the several counterbores being of equal diameter, a cover disk having an annular boss projecting from its under surface, said boss being designed to fit into the counterbore of any selected passage in the bushing, a flow-restricting pin passing loosely through the annular boss of the cover, the pin being of such diameter as to fit loosely in any selected one of the passages in the bushing, and a cover-clamping nut having threaded engagement with an internally threaded upper portion of the chamber, said cover-clamping nut being designed to press the bushing leak-tight against the annular shoulder and at the same time to press the cover leak-tight against the upper surface of the bushing and having a cavity in its under surface arranged to permit limited upward movement of the pin.

7. A pulsation dampener comprising a casing having provision for connecting its lower end to a supply pipe and its upper end to a gauge stem, said casing having therein a cylindrical chamber having an annular shoulder at its lower end, the space bounded by the shoulder communicating with a passage designed to lead to the supply pipe, a cylindrical bushing seated on said shoulder within the chamber, the bushing having a plurality of axially extending passages respectively of different diameters and spaced apart circumferentially of the bushing and at equal distances from the axis of the bushing, a cover disk having a single aperture therein so located that it may be aligned with any selected one of the passages in the bushing, a flow-restricting pin designed to pass through the aperture in the cover and to be disposed in any selected one of the passages with which the aperture in the cover may be aligned, the pin being of a diameter such that it fits loosely in the aperture in the cover and in any passage in which it may be disposed, and a cover-clamping element operative to press the bushing into leak-tight contact with the annular shoulder and at the same time to clamp the cover leak-tight against the upper surface of the bushing thereby to close all of the passages except that which contains the pin.

8. A pulsation dampener comprising a casing having provision for connecting its lower end to a supply pipe and its upper end to gauge stem, said casing having therein a cylindrical chamber having an annular shoulder at its lower end, the space bounded by the shoulder communicating with a passage designed to lead to the supply pipe, a cylindrical block seated on said shoulder within the chamber, the block having a plurality of axially extending passages respectively of different diameters and spaced apart circumferentially of the block and at equal distances from the axis of the block, a cover disk having a single guide aperture which may be placed in alignment with any selected one of the passages in the block, the cover completely closing all of the other passages, a flow-restricting pin fitting loosely in the guide aperture in the cover, the pin being of such length that when its lower end rests upon the bottom of the chamber in the casing its upper end is above the block, the pin having a head at its upper end and the cover having a counterbore for the reception of the head of the pin, and an annular nut having threaded engagement with an internally threaded upper portion of the chamber, said nut being operative to clamp the cover leak-tight against the upper surface of the block, the nut having a cavity in its under surface thereby to permit the head of the pin to rise above the cover, the nut also having a stop member to limit such rise of the pin.

9. A pulsation dampener having a casing provided at its lower end with means for connecting it to a supply pipe and means at its upper end for connecting it to a gauge, the casing having a chamber therein open at the top of the casing and a bore of substantially smaller diameter than that of the chamber leading from said chamber to the lower end of the casing, the chamber having a floor, and flow-controlling means within the chamber, said flow-control means comprising a part having therein a passage so located that its axis intersects the chamber floor, the parts being so constructed and arranged that the passage communicates at its lower end with said bore, a flow constricting pin fitting loosely in said passage, the pin having a head at its upper end and being of such length that when its lower end rests on the floor of the chamber its head is above the upper end of the passage, and an element operative by engagement with said head to limit rise of the pin, said limiting element being so constructed and arranged that it does not restrict the flow of fluid through the passage whatever the position of the pin.

SAMUEL KAHN.